Feb. 19, 1929.

J. T. PEARSON ET AL 1,702,667

JOINT FOR CONDUITS

Filed Jan. 5, 1926

INVENTORS
John T. Pearson
Raymond H. Olley
BY
Parsons & Bodell.
ATTORNEYS.

Patented Feb. 19, 1929.

1,702,667

UNITED STATES PATENT OFFICE.

JOHN T. PEARSON AND RAYMOND H. OLLEY, OF SYRACUSE, NEW YORK, ASSIGNORS TO CROUSE-HINDS COMPANY, OF SYRACUSE, NEW YORK, A CORPORATION OF NEW YORK.

JOINT FOR CONDUITS.

Application filed January 5, 1926. Serial No. 79,455.

This invention relates to conduits particularly electrical conduits and has for its object a particularly simple and efficient means for quickly attaching two conduit sections together and particularly two conduit sections connected by an elbow.

The invention consists in the novel features and in the combinations and constructions hereinafter set forth and claimed.

In describing this invention, reference is had to the accompanying drawings in which like characters designate corresponding parts in all the views.

Figure 1:
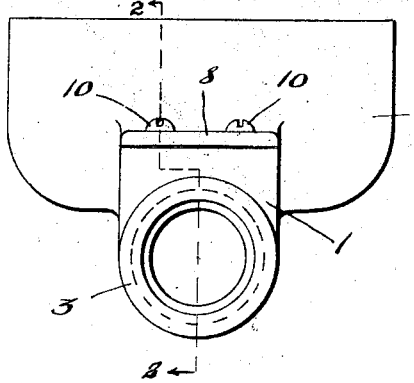
Figure 1 is an elevation of a conduit construction embodying my invention.
Figure 2:
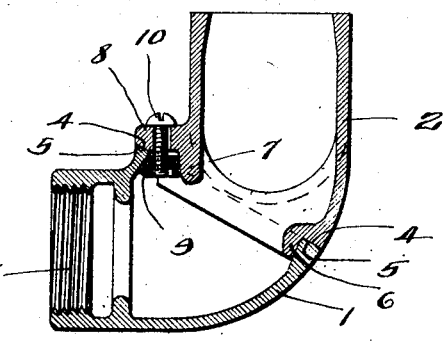
Figure 2 is a sectional view on line 2—2, Figure 1.
Figure 3:
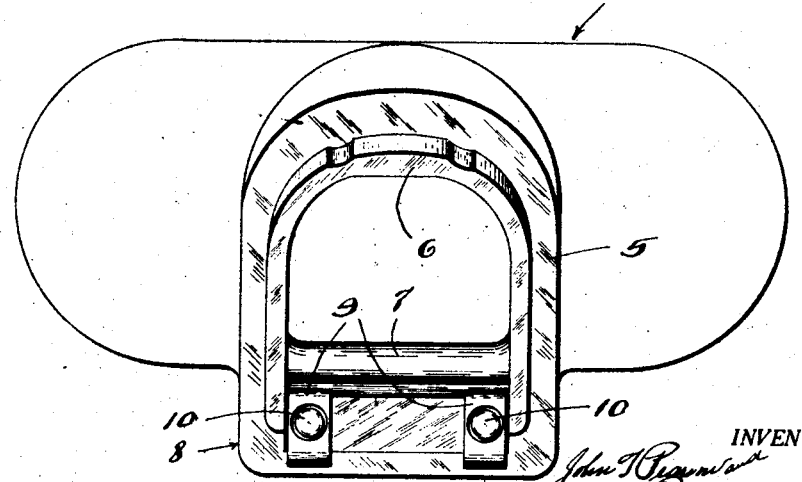
Figure 3 is a view looking upwardly toward the bottom of the conduit outlet box section, the pipe section leading thereto, being omitted.

This invention comprises, generally, two conduit sections joined together, the sections having abutting end bearing faces and one being provided with a portion as a shoulder or flange extending or telescoping into the other section and wedge means interposed between opposing surfaces of the sections and on the interior thereof and at one side of the passage through the sections for thrusting the sections laterally relatively to each other into snug wedging engagement, the wedging means being operable from the outer side of the conduits.

The conduit sections here shown are respectively the sections of a conduit outlet box including the box proper and the pipe section by means of which the box is coupled to the pipe of the conduit system enclosing the wires, the pipe section being arranged at an angle to the box section so that the pipe section and the box section are connected by an elbow and the line of division between the sections extends obliquely through the elbow.

1 and 2 designate respectively, the pipe section and the box section of a conduit outlet box which are arranged at an angle to each other and connected by an elbow, the line of division between the sections extending obliquely from the interior angle formed by the sections 1 and 2 through the exterior angle. The section 1 is provided with a suitable threaded nipple 3 for connection to an electric conduit enclosing the service wires. The box 2 is here shown as elongated in general form and open at its outer side, that is, the side opposite the bottom, the open side being for the outlet of wires in some instances, through a cover or to an electric fixture applied to the open side of the box 2.

The section 1 is provided with an end bearing face 4 around the passage thereof at the joint between the sections and the section 2 is formed with a complemental bearing face 5 and with a shoulder telescoping into the passage of the section 1.

Owing to the separation of the sections of the elbow along an oblique line, the passages of the sections 1, 2 at the joint are oblong in general form and at the exterior angle of the elbow the passages are rounding while at the interior angle, straight. Also owing to the oblique location of this line of separation the openings at the abutting ends of the elbow sections are in line with the passages of the respective pipe sections so that when the wires are being manipulated they do not have to be pulled around a corner in the pipe sections as they are so manipulated when the sections are apart.

The shoulder on the section 2 which telescopes into the passage of the section 1 is in the form of an internal flange 6 extending around the two sides and the rounding end of the passage of the section 2, there being no flange along the side of the passage of the section 2 at the interior angle formed by the sections 1, 2.

The section 2 is also formed with an internal transverse flange 7 between the ends of the lip or flange 6 and opposed to a transverse wall of the passage of the section 1 at the interior angle of the elbow. A portion of the bearing face 5 is formed on an external flange 8 at the interior angle of the elbow or at one side of the conduit section.

The wedging means are interposed between the interior flange 7 and the opposing inner face of the wall around the passage of the section 1 at the joint, and this wedge is operable from the outer side of the exterior flange 8. This wedging means as here shown comprises a pair of nuts 9 interposed between the interior transverse flange 7 and the opposing wall of the section 1 and screws 10 extending through holes in the exterior flange 8 and threading into the nut. Each nut 9 coacts with the flange 7 to be thrust laterally thereby when the screw is tightened, that is, the nut acts on the flange inclined plane fashion. Each nut 9 is also here shown as bevelled at its outer edge and coacts with a complemental beveled face on the opposing wall of the section 1.

In operation, after the wires have been pulled through the conduit connected to the section 1 and then through the box 2, the box can be quickly applied to the conduit 1 by fitting it on the conduit 1 and tightening the screws 10.

What we claim is:—

1. The combination of two conduits having elbow sections, the line of division between which extends obliquely relatively to the sections whereby when the sections are separated the openings along the oblique line of division are in nearly a straight line with the passages of the conduits, the sections having abutting end faces and one section having a flange telescoping the other section and fastening means located wholly in the interior angle of the elbow sections and operable from the outer sides of the sections at such interior angle for thrusting the telescoping portions of the sections into snug engagement and clamping the abutting ends together.

2. The combination of two conduits having elbow sections, the line of division between which extends obliquely relatively to the sections whereby when the sections are separated the openings along the oblique line of division are in nearly a straight line with the passages of the conduits, the sections having abutting end faces and one section having a flange telescoping the other section, a part of the flange being spaced from the opposing wall of the other section and the section formed with the telescoping flange having a second flange covering the space between the former flange and the wall opposed thereto, and fastening means located at one side of the section and operable from the outside thereof for thrusting the telescoping portions of the sections into snug engagement and clamping the abutting ends in engagement, including a wedge member interposed between the spaced apart flange and the opposing wall of the elbow sections, and a clamping screw extending through the second flange and threading into the wedging member.

In testimony whereof, we have hereunto signed our names, at Syracuse, in the county of Onondaga, and State of New York, this 21st day of December, 1925.

JOHN T. PEARSON.
RAYMOND H. OLLEY.